(12) United States Patent
Chang

(10) Patent No.: US 8,459,004 B2
(45) Date of Patent: Jun. 11, 2013

(54) OXYGEN SENSOR BUNG OF MOTOR VEHICLE EXHAUST PIPE

(75) Inventor: Chin-Chuan Chang, Changhua Hsien (TW)

(73) Assignee: Liang Fei Industry Co., Ltd., Changhua Hsien (TW)

( * ) Notice: Subject to any disclaimer, the term of this patent is extended or adjusted under 35 U.S.C. 154(b) by 347 days.

(21) Appl. No.: 12/926,088

(22) Filed: Oct. 26, 2010

(65) Prior Publication Data
US 2012/0096839 A1 Apr. 26, 2012

(51) Int. Cl.
*F01N 3/00* (2006.01)
(52) U.S. Cl.
USPC ............... 60/276; 60/277; 60/285; 60/299; 204/257.5; 204/257.89; 204/431
(58) Field of Classification Search
USPC ............. 60/276, 277, 285, 299; 204/157.5, 204/157.78, 157.89, 424, 431
See application file for complete search history.

(56) References Cited

U.S. PATENT DOCUMENTS

| 4,140,611 | A | * | 2/1979 | Yaegashi et al. | 204/409 |
| 4,240,890 | A | * | 12/1980 | Watanabe et al. | 204/410 |
| 4,362,580 | A | * | 12/1982 | Kane et al. | 148/508 |
| 4,362,609 | A | * | 12/1982 | Sano et al. | 204/428 |
| 4,834,051 | A | * | 5/1989 | Tanaka et al. | 123/703 |
| 6,242,263 | B1 | * | 6/2001 | Faber et al. | 436/143 |
| 7,874,144 | B2 | * | 1/2011 | Bruck | 60/285 |

* cited by examiner

*Primary Examiner* — Binh Q Tran
(74) *Attorney, Agent, or Firm* — Guice Patents PLLC

(57) ABSTRACT

An oxygen sensor bung of motor vehicle exhaust pipe comprises at least a base, a catalytic converter and a seal lid. The base has an external connection section at one end that contains a first chamber to hold the catalytic converter and is fastened by the seal lid. The external connection section has a first external thread on the surface to fasten to a holding seat of an exhaust pipe. The base has a second chamber on another end with a third internal screw hole formed inside to hold an oxygen sensor by fastening with a second external thread formed thereon. The catalytic converter includes a barrel type casing containing a beehive structure made of precious metal to increase exhaust gas process area. Therefore impurities in the exhaust gas can be reduced and timely replacement of the catalytic converter can be accomplished, and accurate detection of oxygen content can be achieved.

6 Claims, 7 Drawing Sheets

OXYGEN SENSOR BUNG OF MOTOR VEHICLE EXHAUST PIPE

BACKGROUND OF THE INVENTION

1. Field of the Invention

The present invention relates to an oxygen sensor bung of motor vehicle exhaust pipe to increase process area of exhaust gas to reduce impurities in the exhaust gas and allow timely replacement of catalytic converter to achieve accurate detection of oxygen content.

2. Description of the Prior Art

Conventional techniques to detect exhaust gas of motor vehicles generally are accomplished through an oxygen sensor (O2 sensor in short hereinafter) to monitor whether catalyst functions properly. However, the exhaust gas often contains impurities that could clog the O2 sensor and affect detection accuracy, such as exhaust gas flow speed, duty temperature and contents cannot be accurately judged that could result in not proper signaling of engine alarm lights and even impact engine fuel injection and ignition system.

To remedy the aforesaid problems many techniques have been proposed in prior art. For instance R.O.C. patent M375123 discloses a bung with the interior coated with a catalyst conversion agent to reduce impurities in the exhaust gas. In practice it still has drawbacks, notably:

1. The thin layer of catalyst conversion agent coated in the interior does not have sufficient process area and is easily peeled off and becomes dysfunctional.

2. Once the catalyst conversion agent is dysfunctional it cannot be recoated again, and the entire set has to be replaced. Hence the cost of repairs and maintenance is higher.

3. The coated catalyst conversion agent cannot fully process the impurities in the exhaust gas and could result in inaccurate detection of the O2 sensor and affect maneuverability of vehicles during driving.

SUMMARY OF THE INVENTION

In view of the aforesaid problems, the present invention aims to provide an improved oxygen sensor bung of motor vehicle exhaust pipe to increase process area of exhaust gas. To achieve the foregoing object the invention comprises at least a base, a catalytic converter and a seal lid. The base has an external connection section at one end that contains a first chamber to hold the catalytic converter, and is fastened by the seal lid. The external connection section has a first external thread on the surface to firmly couple with a holding seat of an exhaust pipe. The base has a second chamber on another end with a third screw hole formed inside to hold an O2 sensor by fastening with a second external thread formed thereon. The catalytic converter includes a barrel type casing to house a beehive structure made of precious metal to increase exhaust gas process area. Therefore impurities in the exhaust gas can be reduced and timely replacement of the catalytic converter can be accomplished, and accurate detection of oxygen content can be achieved.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
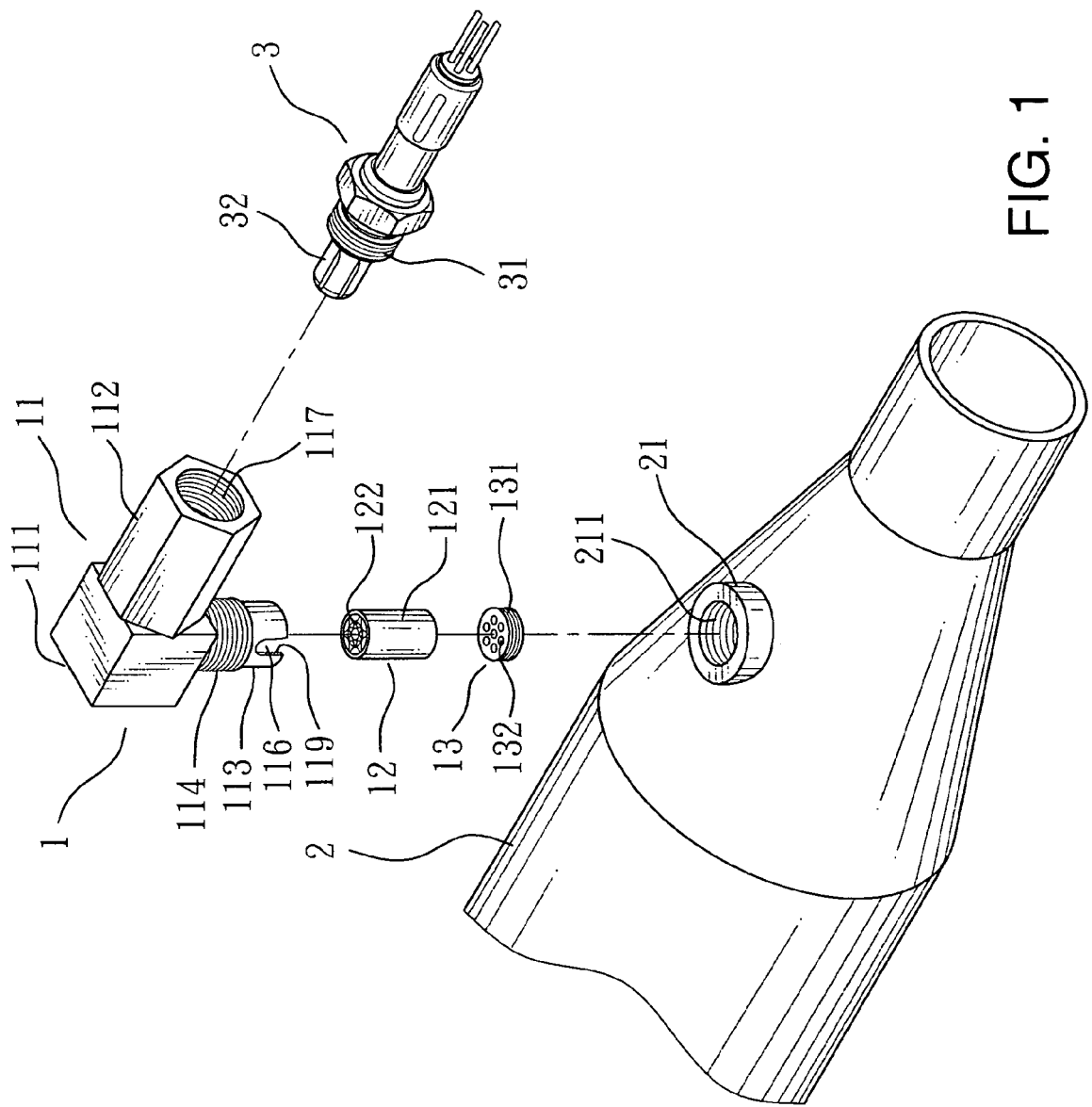
FIG. 1 is an exploded view of the invention.
Figure 2:
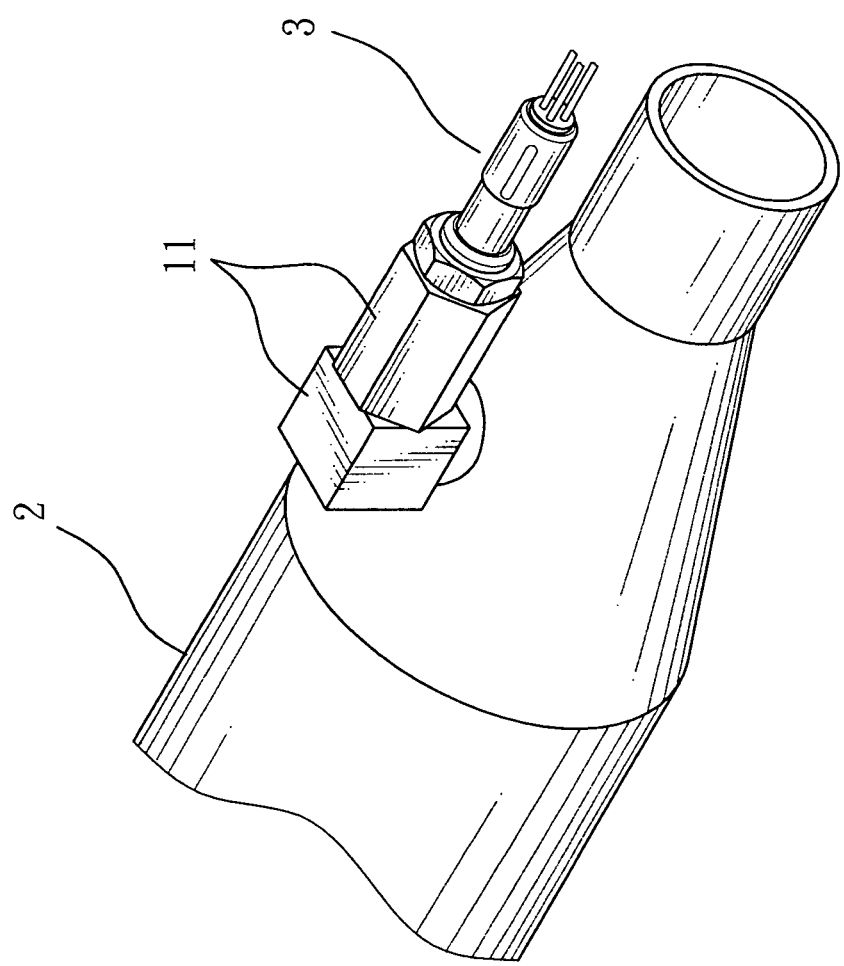
FIG. 2 is a perspective view of the invention.

Please refer to FIGS. 1 through 4 for a first embodiment of the invention that is especially adaptable for horizontal installation. The oxygen sensor bung 1 of motor vehicle exhaust pipe 2 of the invention comprises at least a base 11, a catalytic converter 12 and a seal lid 13.

The base 11 has an external connection section 113 at one end that contains a first chamber 116 and a first internal screw hole 119 formed on an inner wall. The external connection section 113 further has a first external thread 114 formed on the surface to engage with a holding seat 21 of an exhaust pipe 2. The holding seat 21 has a second internal screw hole 211 to engage with the first external thread 114 for fastening together. The base 11 has another end containing a second chamber 110 with a third internal screw hole 117 formed therein to fasten with a sensor head 32 of an O2 sensor 3 which has a second external thread 31 for fastening.

The catalytic converter 12 is held in the first chamber 116 of the base 11 and includes a barrel type casing 121 to house a beehive structure 122 made of precious metal (such as palladium, platinum, rhodium).

The seal lid 13 has at least one opening 132 and a third external thread 131 formed on the circumference to fasten to the first internal screw hole 119 of the base 11 to confine the catalytic converter 12.

Figure 3:
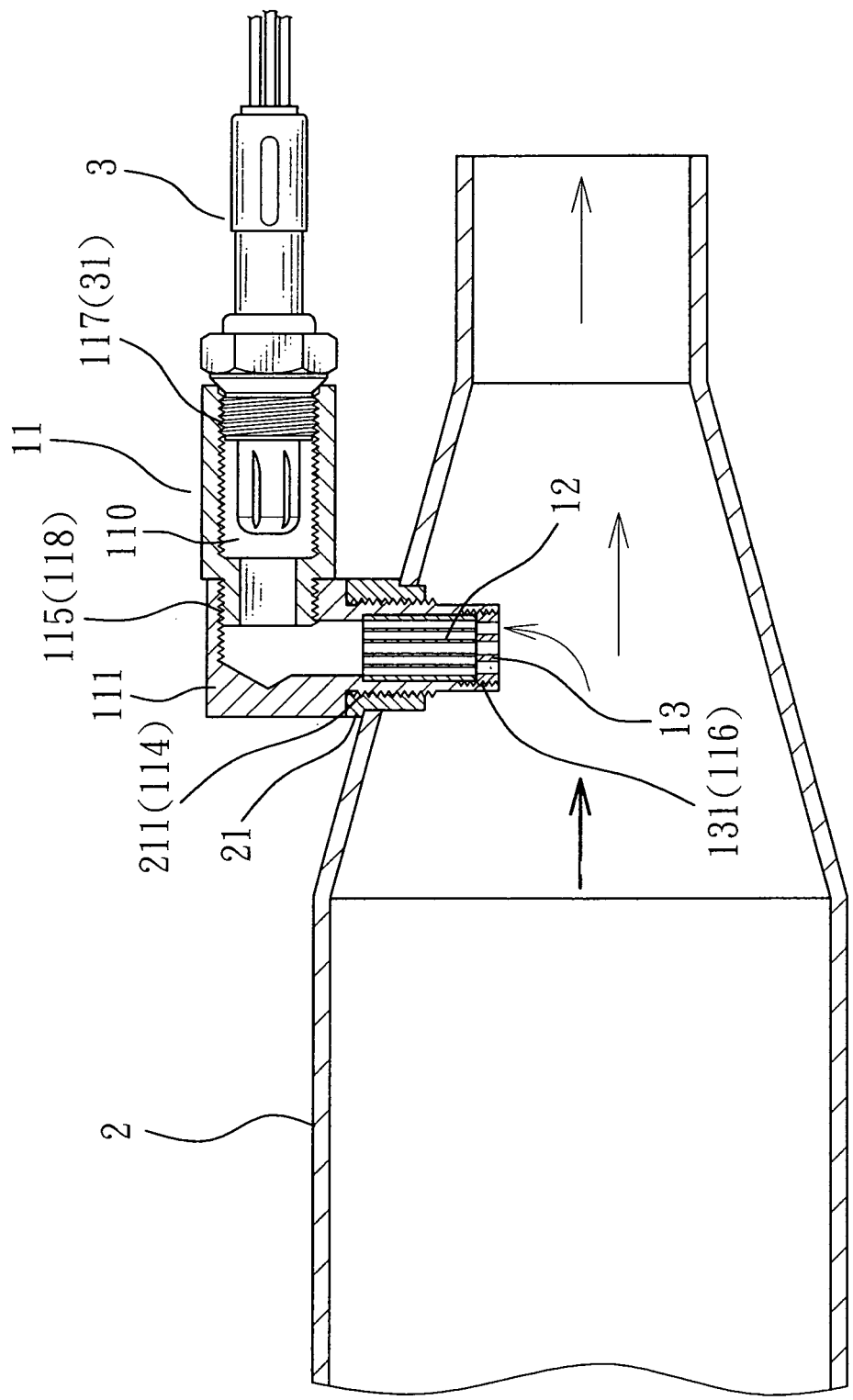
FIG. 3 is a sectional view of the invention.
Figure 4:
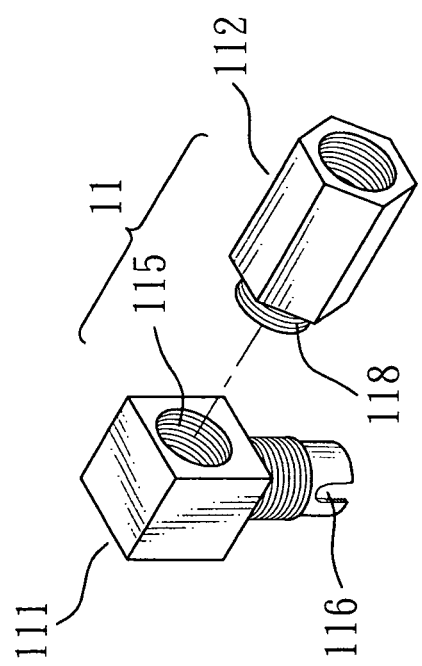
FIG. 4 is an exploded view of the base of the invention.

The base 11 includes a first duct bung 111 and a second duct bung 112 that are connected sideward (referring to FIGS. 3 and 4). The first duct bung 111 has a fourth internal screw hole 115 at one side to fasten to a fourth external thread 118 formed on one side of the second duct bung 112. The first chamber 116 in the first duct bung 111 communicates with the second chamber 110 of the second duct bung 112.

Figure 5:
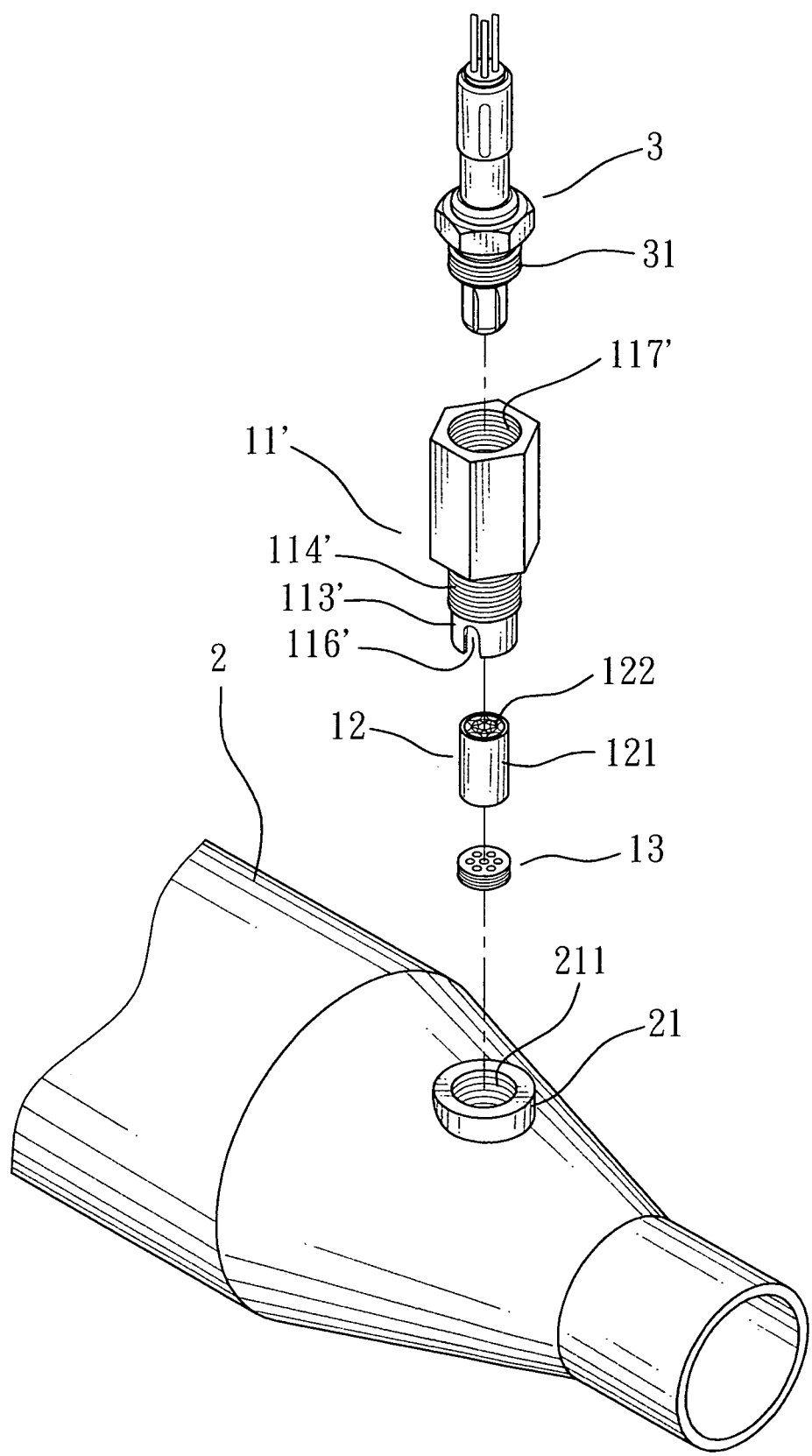
FIG. 5 is an exploded view of another embodiment of the invention.
Figure 6:
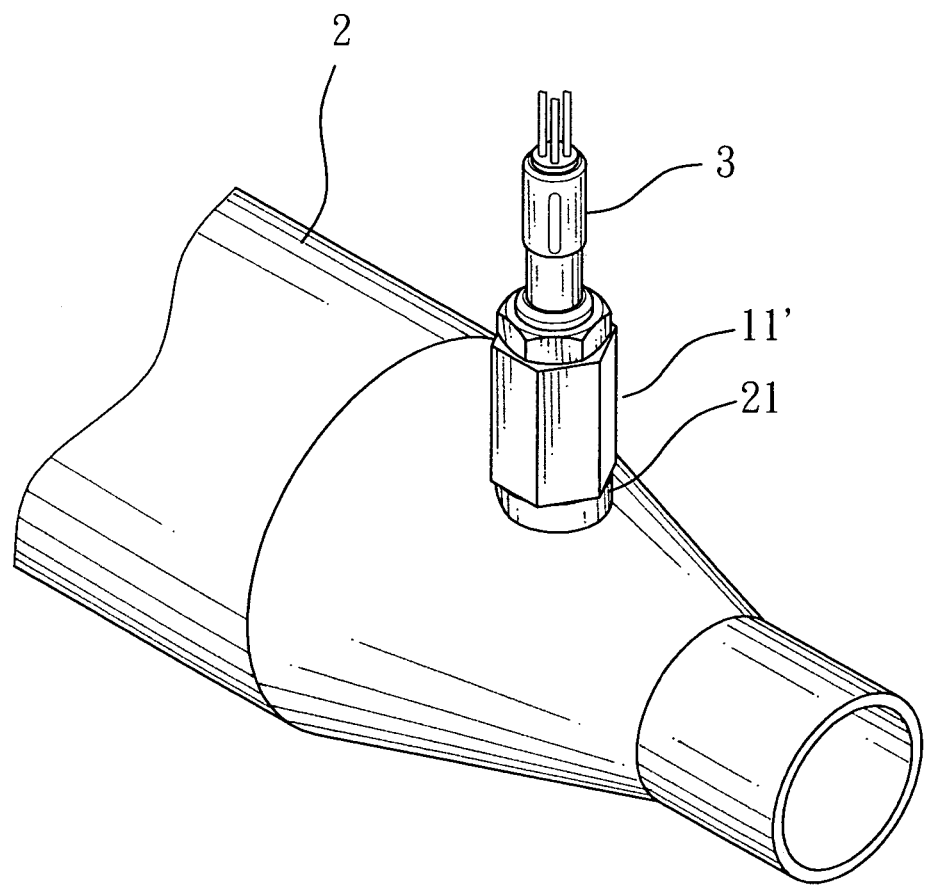
FIG. 6 is a perspective view of another embodiment of the invention.
Figure 7:
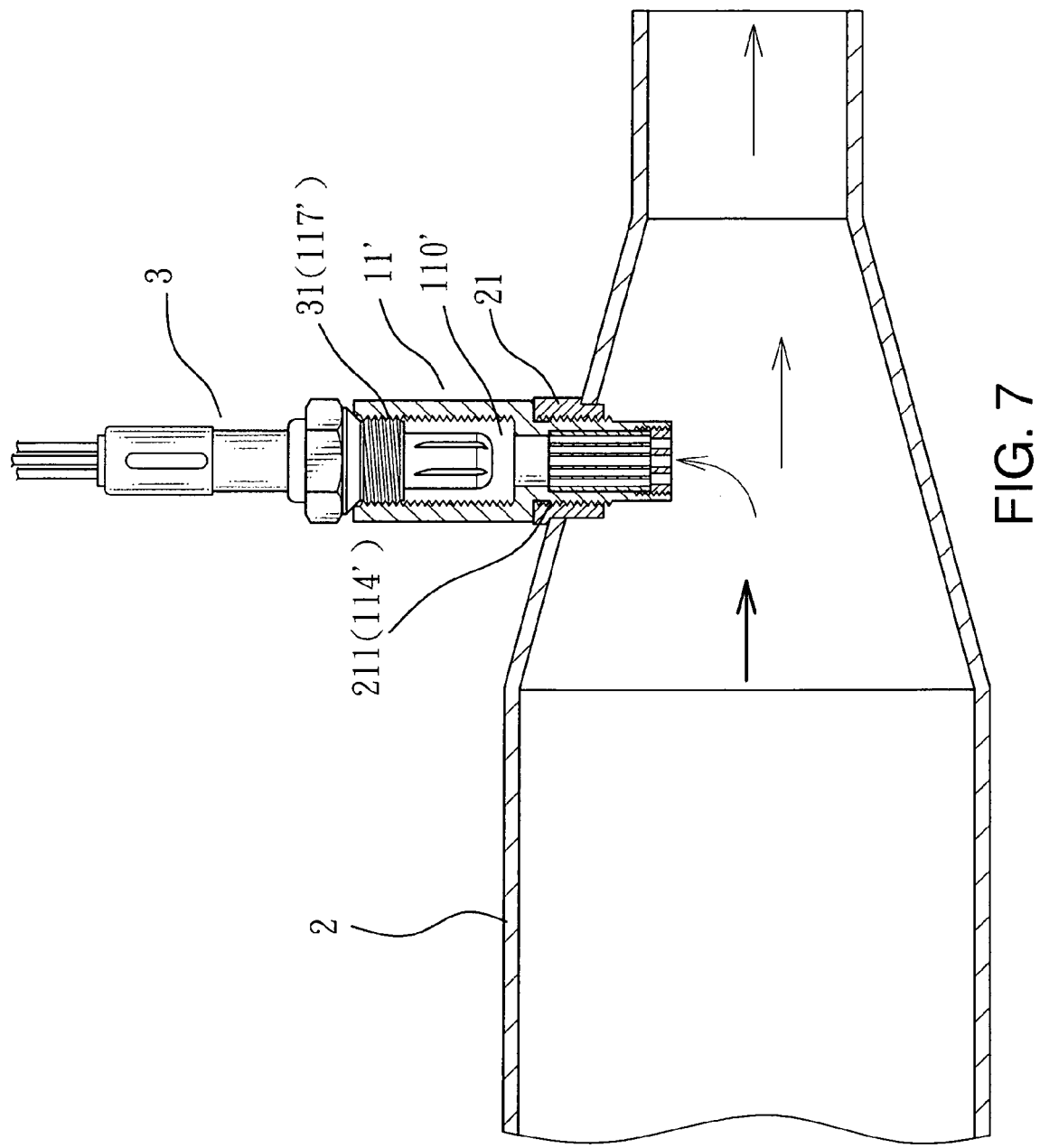
FIG. 7 is a sectional view of another embodiment of the invention.

Refer to FIGS. 5, 6 and 7 for a second embodiment of the invention that is adaptable for vertical installation. It includes a base 11' perpendicular to the exhaust pipe 2. It also has an external connection duct 113' with a first chamber 116' holding the catalytic converter 12 which is retained by fastening with the seal lid 13. The external connection duct 113' is coupled on the holding seat 21 of the exhaust pipe 2 with a first external thread 114' fastened to the second internal screw hole 211 of the holding seat 21. The base has a second chamber 110' with a third internal screw hole 117' formed therein fastened to the second external thread 31 of the O2 sensor 2.

By means of the structure set forth above when exhaust gas discharged from the exhaust pipe 2 passes through the catalytic converter 12 the beehive structure 122 made of precious metal provides a greater area to convert the impurities in the exhaust gas more thoroughly and effectively, thus contamination of the sensor head 32 by the impurities that might otherwise take place can be averted without affecting detection accuracy.

In short, the present invention can increase catalyst conversion area to enhance conversion efficiency of the impurities in the exhaust gas to ensure that accurate detection is performed, and exhaust gas can be discharged smoothly. The catalytic converter can also be replaced timely to overcome the problems of the conventional techniques of difficult to remove and replace and undesirable conversion effect. It provides a significant improvement over the conventional techniques.

I claim:

1. An oxygen sensor bung of motor vehicle exhaust pipe comprising:
    a base having a first base end and a second base end, an external connection section and a first chamber are located in the first base end and a second chamber is located on the second base end and communicating with the first chamber, an oxygen sensor is removably connected to the second base end and a sensor head of the oxygen sensor is located in the second chamber, the first base end of the base is removable connected to a holding seat of an exhaust pipe;
    a catalytic converter removably inserted into the first chamber, the catalytic converter having a barrel casing housing a beehive structure made of precious metal; and
    a seal lid having at least one opening and removably connected to the first base end of the base selectively fixing the catalytic converter in the first chamber.

2. The oxygen sensor bung of motor vehicle exhaust pipe of claim 1, wherein the base includes a first duct bung and a second duct bung threadedly connected together, an axis of the first duct bung is located perpendicular to an axis of the second duct bung.

3. The oxygen sensor bung of motor vehicle exhaust pipe of claim 1, wherein the external connection section has a first internal screw hole formed on an inner wall thereof.

4. The oxygen sensor bung of motor vehicle exhaust pipe of claim 1, wherein the external connection section has a first external thread formed on the surface thereof.

5. The oxygen sensor bung of motor vehicle exhaust pipe of claim 1, wherein the second chamber has a third screw hole fastened to a second external thread formed on the oxygen sensor.

6. The oxygen sensor bung of motor vehicle exhaust pipe of claim 1, wherein the seal lid has a third external thread fastened to a first internal screw hole formed on the base.

* * * * *